(No Model.)
F. B. BROWN.
HALTER HOOK.
No. 254,602. Patented Mar. 7, 1882.
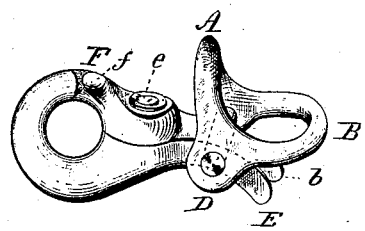
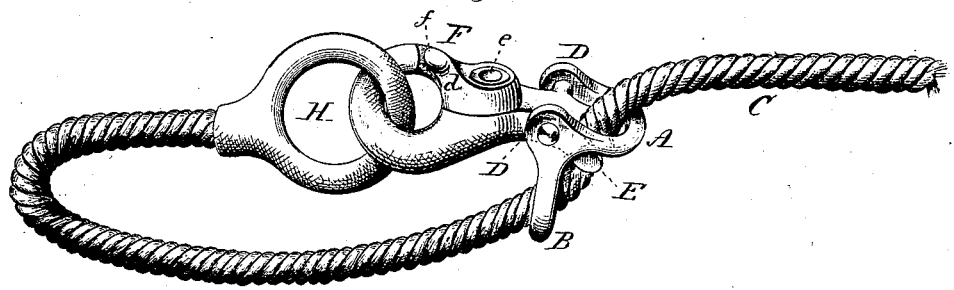
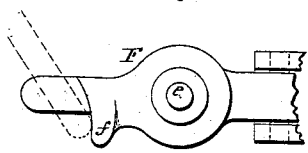
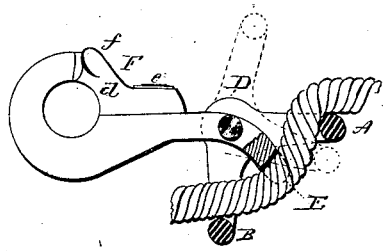
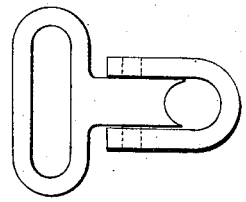
Witnesses.
J. H. Shumway
L. D. Rogers.
F. Barton Brown
Inventor
By atty:
John F. Earle

UNITED STATES PATENT OFFICE.

F. BARTON BROWN, OF BOSTON, MASSACHUSETTS.

HALTER-HOOK.

SPECIFICATION forming part of Letters Patent No. 254,602, dated March 7, 1882.

Application filed August 6, 1881. (No model.)

*To all whom it may concern:*

Be it known that I, F. BARTON BROWN, of Boston, in the county of Suffolk and State of Massachusetts, have invented a new Improvement in Halter-Hooks; and I do hereby declare the following, when taken in connection with the accompanying drawings and the letters of reference marked thereon, to be a full, clear, and exact description of the same, and which said drawings constitute part of this specification, and represent, in—

Figure 1, a perspective view; Fig. 2, the same as applied to the halter; Figs. 3 and 5, sections to illustrate the operation; Fig. 4, a modification.

This invention relates to a device for securing a halter around the neck of animals, with special reference to rope halters, the object being the construction of a hook which shall be easily attachable to and adjustable upon the rope, and so as to engage the end which is passed around the neck of the animal; and it consists in a clasp composed of two bearing-points, over which the rope passes, combined with a cam between them, which depresses the rope and gripes it upon the said two bearings or points, with a snap-hook attached to or engaged with the said cam, so that a pull upon the halter tends to tighten the gripe upon the rope, as more fully hereinafter described.

A B represent two connected loops or bearing-points, rounded upon their inside, so as to conform substantially to the shape of the rope which is to be passed through them. They come together, and are united so as to form ears D on each side of the rope. Between the said ears the cam E is hung upon pivots $a$. The working edge of the said cam is hollowed out transversely, as at $b$, to bear upon the side of the rope opposite the loops or bearing-points A B. The cam E is extended beyond the pivots, and terminates in a snap-hook, F, of any suitable construction, and so as to be engaged with or disengaged from the loop H on the end of the rope.

The rope is run through over the bearings A B, while the cam is turned backward, as seen in broken lines, Fig. 3, or the loops A B may be turned above the cam, as in Fig. 1, and the rope run through in that position. The cam is then turned down, as seen in Figs. 2 and 3, striking upon the rope between the two loops A B, and so as to make a short bend between said loops and clamp the rope between the cam and the forward loop, A, as seen in Figs. 2 and 3. The position at which this engagement is made is at a distance from the end or loop H sufficient to pass that end around the animal's neck and to engage with the hook F.
This engagement made, the pull on the halter tends to draw the cam tighter upon the rope.

To adjust the halter to different sizes it is only necessary to reverse the operation of engagement before described. Instead of making the hook a part of the cam, the cam may terminate in a loop, as seen in Fig. 4, and the hook be attached to the end of the rope; yet I prefer to make the hook as a part of the cam.

The hook shown in the accompanying illustration has certain peculiarities which adapt it especially for this purpose. The tongue $d$ is hung upon a pivot, $e$, to turn in a plane at right angles to the plane of the hook, and on the front or on the closing side of the tongue is a stud, $f$, working in the plane in which the tongue swings, as seen in Fig. 5, and near the bearing-point between the tongue and hook. The object of this construction is to prevent the ring H, or whatever it may be, which is engaged with the hook, from accidentally opening the tongue. The stud prevents the ring from bearing upon the side of the tongue back of the point of the hook, as seen in Fig. 5, which shows the hook in the position in which it would open the tongue by a twisting force, were it not for the stud $f$. While described as a halter-hook, it will be understood that it may be used for other purposes, and the loops and cam hinged thereto may be used without a hook.

I have described the invention as specially adapted to rope halters; but it will be understood that other flexible material may be used as the halter-strap.

I do not wish to be understood as broadly claiming providing the tongue of a snap-hook with a projection, as such I am aware is not new; but such projections have been applied on the back of the tongue—that is, so as to project in a plane parallel with the plane of the hook and form the finger-piece by which to conveniently turn the tongue. I am not aware that a laterally-projecting stud at the point of the tongue and on that side opposite to which the tongue swings in opening, so as to serve as a guard to prevent accidental disengagement, has before been made.

I claim—

1. In a halter-hook, the combination of the loops A B, connected to form ears D D, with a cam, E, hung between said ears, the said cam extending from the bearing and terminating in device for engagement therewith, substantially as described.

2. The combination of the loops A B, connected to form ears D D, with a cam, E, hung between said ears, the said cam extending from the bearing and terminating in a snap-hook, substantially as described.

3. A snap-hook having the tongue hinged to its shank by a pivot parallel with the plane of the hook, and so that the tongue will swing in a plane at right angles to the hook, the said tongue provided with the stud $f$ at the point of the tongue, and on the side opposite that toward which the tongue swings, projecting from the tongue in a plane parallel with the plane in which the tongue swings, substantially as described.

F. BARTON BROWN.

Witnesses:
ROBERT W. SANFORD,
CHAS. M. REED.